(12) United States Patent
Otter

(10) Patent No.: US 6,878,334 B2
(45) Date of Patent: Apr. 12, 2005

(54) CONDENSING HEAT EXCHANGER FORMED OF NORBORNENE POLYMER

(75) Inventor: James William Otter, Fairfield Glade, TN (US)

(73) Assignee: Carrier Corporation, Syracuse, NY (US)

( * ) Notice: Subject to any disclaimer, the term of this patent is extended or adjusted under 35 U.S.C. 154(b) by 153 days.

(21) Appl. No.: 09/930,007

(22) Filed: Aug. 14, 2001

(65) Prior Publication Data

US 2003/0034154 A1 Feb. 20, 2003

(51) Int. Cl.$^7$ ............................................. B29D 23/00
(52) U.S. Cl. ...................... 264/523; 264/540; 264/573; 264/563; 156/244.13; 156/308.2
(58) Field of Search .................... 165/DIG. 536, 165/DIG. 220, DIG. 209, 41, 42, 43, 44, 179; 264/30, 535, 540, 564, 572, 573, 539, 563, 565, 523; 156/69, 244.13, 287, 297, 308.2, 309.9

(56) References Cited

U.S. PATENT DOCUMENTS

| | | | | |
|---|---|---|---|---|
| 3,425,092 A | * | 2/1969 | Taga | 425/192 R |
| 3,426,841 A | * | 2/1969 | Johnson | 165/178 |
| 3,648,768 A | * | 3/1972 | Scholl | 165/171 |
| 3,779,005 A | * | 12/1973 | Sorensen | 60/617 |
| 4,202,405 A | * | 5/1980 | Berg | 165/110 |
| 4,245,697 A | * | 1/1981 | Togashi | 165/179 |
| 4,362,688 A | * | 12/1982 | Nakagawa | 264/503 |
| 4,807,588 A | * | 2/1989 | Bentley et al. | 126/110 R |
| 4,848,314 A | * | 7/1989 | Bentley | 126/116 R |
| 5,038,750 A | * | 8/1991 | Ripka et al. | 126/99 A |
| 5,078,946 A | * | 1/1992 | Fletcher et al. | 264/292 |
| 5,098,750 A | * | 3/1992 | Ueno et al. | 428/304.4 |
| 5,525,288 A | * | 6/1996 | Ninomiya et al. | 264/506 |
| 5,696,045 A | * | 12/1997 | Winter et al. | 502/113 |
| 5,787,970 A | * | 8/1998 | Larinoff | 165/111 |
| 5,979,548 A | * | 11/1999 | Rhodes et al. | 165/284 |
| 6,006,741 A | * | 12/1999 | Daddis, Jr. | 126/110 R |

\* cited by examiner

*Primary Examiner*—Gladys J P Corcoran
(74) *Attorney, Agent, or Firm*—Carlson, Gaskey & Olds

(57) ABSTRACT

A condensing heat exchanger is formed of norbornene polymer, preferably a norbornene homopolymer or copolymer. A plurality of norbornene polymer pellets are melted and extruded to form a first tube. The tube is then blow molded into a mold. A second extruded tube is also blow molded into a U-shape, and the first tube is positioned in the U-shaped opening to form a cell. The ends of the cells are attached to a holding plate by thermal adhesion or heating and flaring. Norbornene polymer possesses exceptional thermal resistance to the high temperature flue vent gases and has physical and chemical resistance to the acidic condensate formed by the condensing heat exchanger.

19 Claims, 6 Drawing Sheets

CONDENSING HEAT EXCHANGER FORMED OF NORBORNENE POLYMER

BACKGROUND OF THE INVENTION

The present invention relates generally to a blow molded condensing heat exchanger made of a norbornene polymer having thermal, chemical and physical resistant to the conditions of a condensing heat exchanger.

Condensing heat exchangers are employed in condensing furnaces to increase efficiency. The condensing heat exchanger cools the heating fluid to a temperature below the dew point. As the temperature drops below the dew point, a liquid condensate, water vapor, condenses from the heating fluid. As the liquid condensate condenses, heat is transferred from the water vapor to the air to be heated. As more heat is produced, the efficiency of the system is increased.

Polypropylene films are commonly utilized to make a laminated condensing heat exchanger material to prevent corrosion of the heat exchanger by the water vapor liquid condensate. In prior condensing heat exchangers, the film is formed by melted polypropylene pellets which are extruded or cast to form a film. The metal surface of the condensing heat exchanger is then heated. The film is applied to the heated condensing heat exchanger, and the heated surface slightly melts the film, adhering the film to the condensing heat exchanger. A roller passes over the surface of the film to further adhere the film to the condensing heat exchanger. Alternatively, the film is adhered to the metal with an appropriate adhesive and primer.

Blow molding and extrusion are known process commonly employed to make bottles or tubes. Polyester is a polymer which is often utilized during blow molding or extrusion. However, polyester does not have acceptable physical, chemical or thermal resistance to the conditions of a condensing heat exchanger.

There are several drawbacks to the polypropylene film of the prior art. For one, the metal can corrode if the film is not continuous or if there are holes in the film. Additionally, it is costly to manufacture and apply the prior art film to the metal heat exchanger. Therefore, it would be advantageous to form a condensing heat exchanger entirely out of a corrosion resistant material.

Hence, there is a need in the art for a condensing heat exchanger made of a polymer which is capable for withstanding the conditions of a condensing heat exchanger.

SUMMARY OF THE INVENTION

The present invention relates to a condensing heat exchanger made of a norbornene polymer.

The condensing heat exchanger of the present invention is formed of a norbornene polymer, preferably norbornene homopolymers and copolymers. In a first embodiment, a plurality of norbornene pellets are melted and extruded from a die to form a hot inner extruded. The tube is positioned in a mold which encases the tube and pinches off a first end. Air blown into the tube expands the hot tube into the shape of the mold. Preferably, the interior surface of the mold includes a plurality of grooves to increase the surface area for heat transfer. Once cooled, the inner tube is removed from the mold. An outer extruded tube is also blow molded into a U-shape.

After blow molding, the inner tube is positioned in an opening of the U-shaped outer tube, and the ends are attached to a holding plate to create a cell. A flue gas flow passage is formed between the inner and outer tubes which release and exchange heat to air which flows between cells. If the holding plate is made of norbornene polymer, the tubes are thermally adhered to the holding plate. Alternatively, if the holding plate is formed of metal, the ends of the tubes are heated and flared to secure the tubes to the metal holding plate. The holding plates and the attached tubes are then positioned in and secured to the heat exchanger transfer box to form a condensing heat exchanger.

Alternatively, a cell is blow molded in a single process. An extruded tube is positioned in a mold having a substantially "w-shaped" outer part and a substantially "u-shaped" inner part and blow molded, expanding the tube into the shape of the mold. The ends of the expanded tube are adhered to a blow-molded norbornene polymer plate or flange which surrounds and encloses the expanded tube to form the cell. The flue gases flow through the expanded serpentine tube and transfer heat to the surrounding air to be heated.

In a third embodiment, a plurality of tubes of a desired length, diameter and thickness are extruded. The plurality of tubes are stacked and the ends are secured to a holding plate to form a shell and tube heat exchanger.

Norbornene polymers possess exceptional physical, chemical and thermal resistance to the high temperature flue vent gases and acidic condensate formed by the condensing heat exchanger.

Accordingly, the present invention provides a condensing heat exchanger made of a norbornene polymer.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
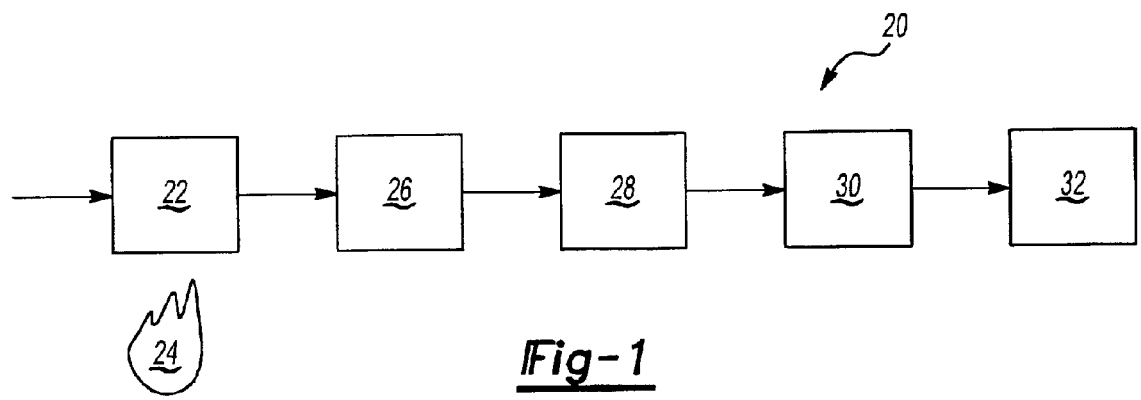
FIG. 1 illustrates a schematic diagram of a condensing furnace system.

FIG. 1 schematically illustrates a condensing furnace system 20. Air and natural gas enters a burner 22 which burns the air and natural gas by a flame 24 to produce hot combustion products. The hot combustion products pass through a primary heat exchanger 26, which cools the hot combustion products and extracts heat to the air to be heated. To increase the efficiency of the system 20, a condensing heat exchanger 28 is used to extract additional heat. As the hot combustion gases pass through the condensing heat exchanger 28, the condensing heat exchanger 28 cools the combustion products to a temperature below the dewpoint of the combustion products. Water vapor begins to condense, allowing more heat to be extracted from the combustion products and increasing efficiency. As the liquid condensate condenses, heat is transferred from the water vapor to the air to be heated. An inducer fan 30 provides a source of suction on the condensing heat exchanger 28 and assists in pulling the flow of the combustion products through the system 20. The combustion products are expelled from the system 20 through a flue 32.

Figure 2:
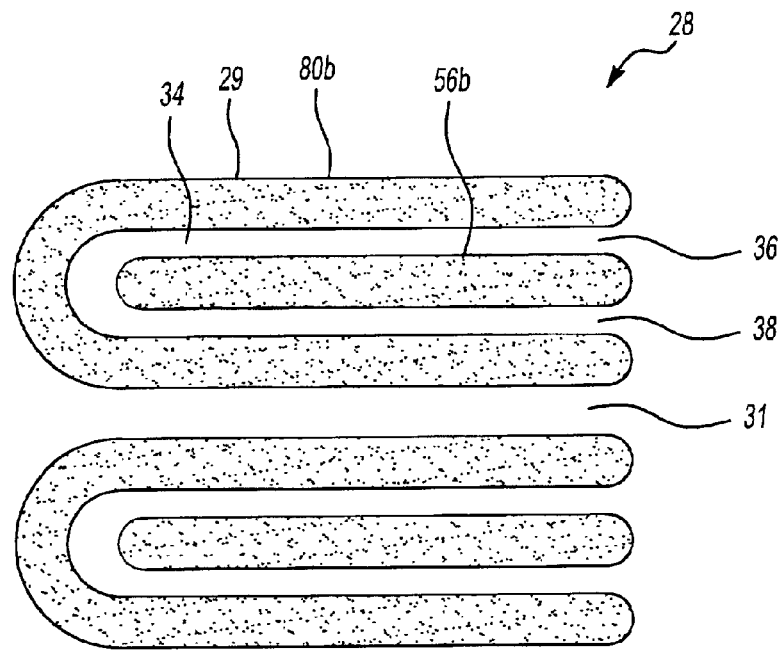
FIG. 2 illustrates a schematic diagram of a pair of cells of a condensing heat exchanger.

FIG. 2 illustrates a pair of cells 29 of the condensing heat exchanger 28. Each cell 29 including a flow passage 34 through which the combustion products or flue gases flow. The hot flue gases enter the flow passage 34 through an inlet 36. As the hot flue gases flow through the flow passage 34, heat is transferred to the air to be heated which flows in the air passage 31 between the cells 29. The cooled flue gases then exit the cell 29 through the outlet 38. Although only two cells 29 are illustrated, a plurality of cells are employed in the condensing heat exchanger 28.

Figure 3:
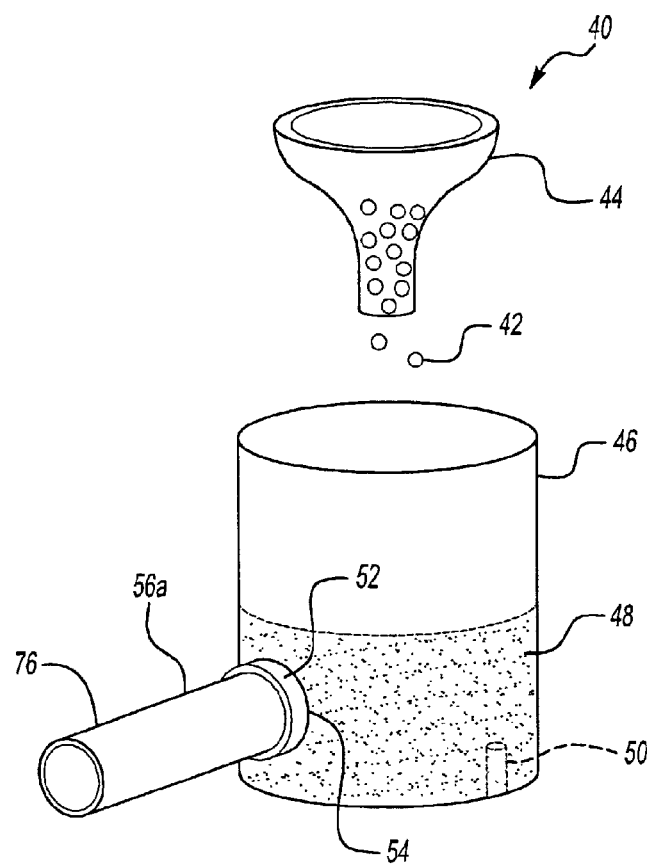
FIG. 3 illustrates a schematic diagram of an apparatus for melting norbornene polymer and extruding a tube.

Referring now to FIG. 3, one apparatus 40 for forming the norbornene polymer condensing heat exchanger 28 is schematically illustrated. Preferably, the norbornene polymer is a homopolymer or a copolymer. A plurality of norbornene polymer pellets 42 stored in a heated funnel 44 are dropped into a hollow cylinder 46. The pellets 42 are heated in the cylinder 46 to form melted norbornene polymer 48, a heated internal screw 50 stirring the melted nonborene polymer 48 during melting. The melted nonborene polymer 48 is extruded from a die 52 positioned in an opening 54 in the cylinder 46, forming an extruded norbornene tube polymer 56A.

Figure 4:
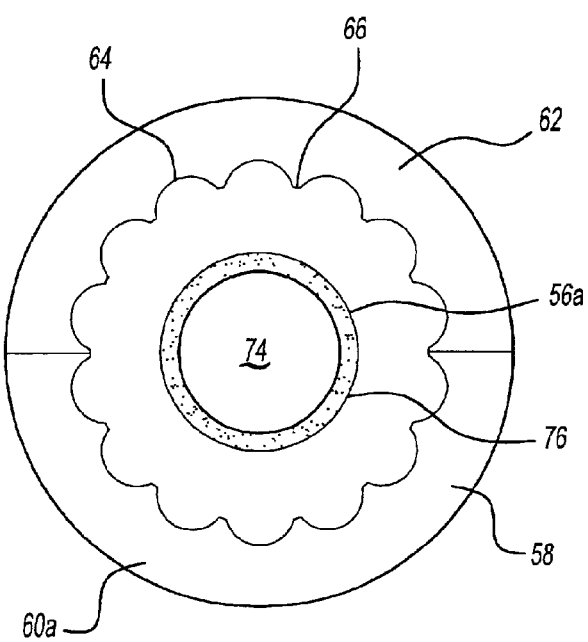
FIG. 4 illustrates a cross-sectional view of the extruded norbornene polymer tube positioned in a mold prior to blow molding to form an inner expanded tube.

As shown in FIG. 4, in one embodiment, the tube 56A is placed on bottom portion 58 of a mold 60A. A top portion 62 overlays the bottom portion 58, encasing the hot extruded tube 56A in the mold 60A. Preferably, the mold 60A include a plurality of grooves 64 on the interior surface 66.

Figure 5:
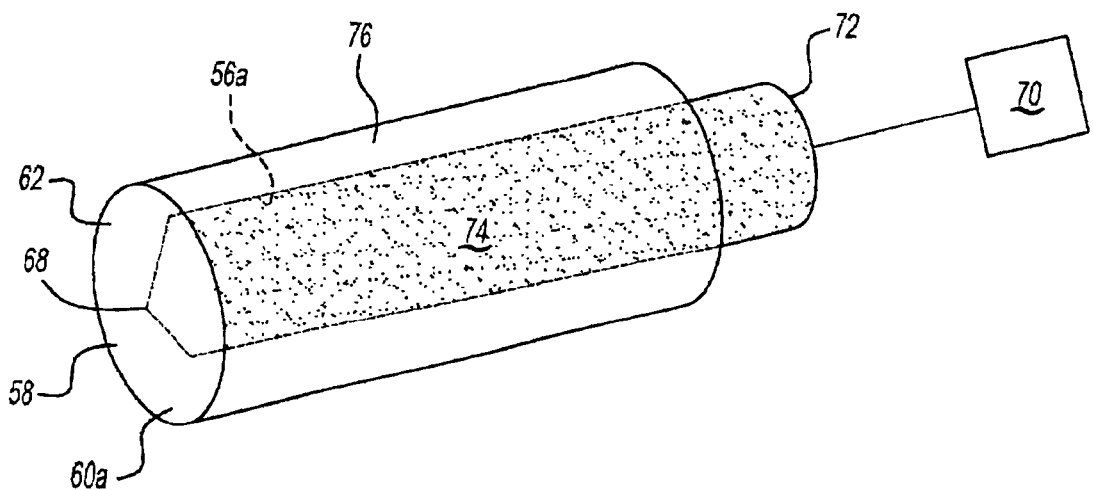
FIG. 5 illustrates a perspective view of the norbornene polymer tube in the mold prior to blow molding.
Figure 6:
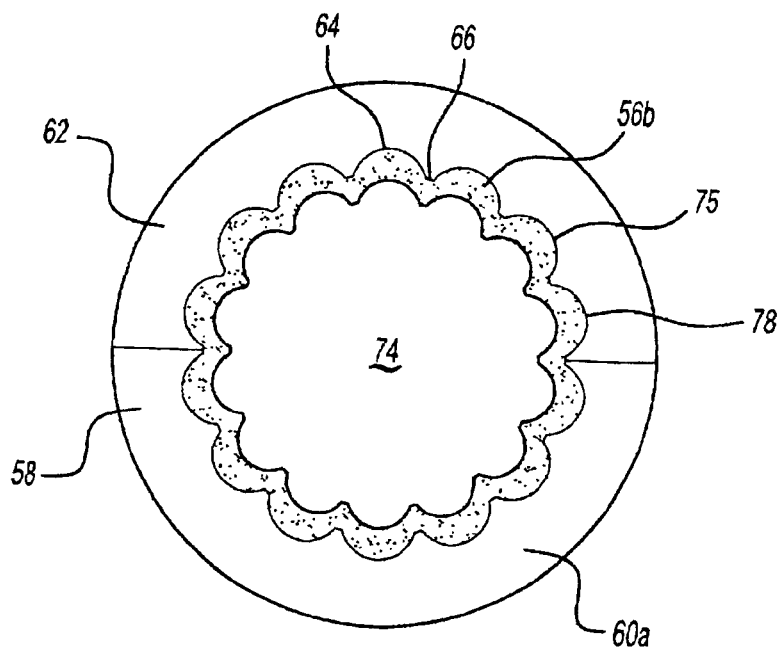
FIG. 6 illustrates a cross-sectional view of the expanded norbornene polymer tube after blow molding.

Referring now to FIG. 5, when the tube 56A is positioned in the mold 60A, a first end 68 of the tube 56A is pinched closed. A blowing machine 70 positioned on the second end 72 of the tube 56A blows air into the internal space 74 of the tube 56A, expanding the tube 56A as shown in FIG. 6 until the outer surface 76 of the expanded tube 56B contacts the interior surface 66 of the mold 60A. The expanded tube 56B forms into the shape of the mold 60A, including a plurality of grooves 78 which increase the surface area and heat transfer.

Figure 7:
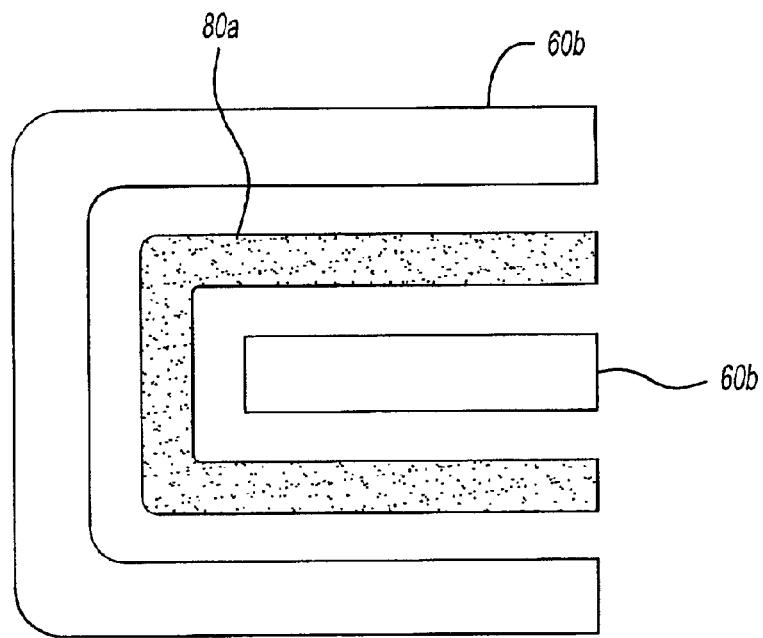
FIG. 7 illustrates a cross-sectional view of an extruded norbornene polymer tube positioned in a U-shaped mold to form an outer expanded tube.
Figure 8:
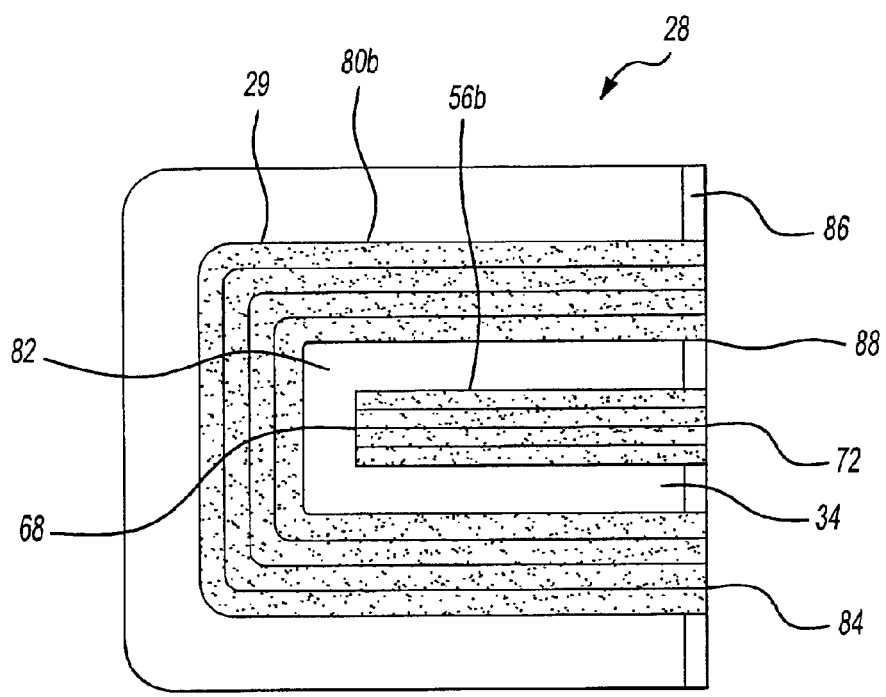
FIG. 8 illustrates a cross-sectional side view of the blow-molded condensing heat exchanger showing a first type of attachment of a cell to a holding plate.

As shown in FIG. 7, a second extruded tube 80A is blow-molded into a mold 60B using the above-described method to form a substantially U-shaped expanded tube 80B having an opening 82, shown in FIG. 8. When the cell 29 is assembled, the first expanded tube 56B is positioned in the opening 82 of the second expanded tube 80B, creating a flow passage 34 between the expanded tubes 56B and 80B for the passage of flue gases. The end 72 of the first expanded tube 56B and ends 84 of the second expanded tube 80B are each attached to an aperture 88 in a holding plate or flange 86 which surrounds the tubes 56B and 80B to form the cell 29.

If the holding plate 86 is formed of a norbornene polymer, the ends 72 and 84 of the expanded tubes 56B and 80B are thermally adhered to the holding plate 86. Although only one cell 29 is illustrated in FIG. 8, a plurality of cells 29 are attached to the holding plate 86, and an air flow passages 31 defined between each of the cells 29. The holding plate 86 with the attached cells 29 are then positioned in a heat exchanger transfer box 90 of the condensing heat exchanger 28.

Figure 9:
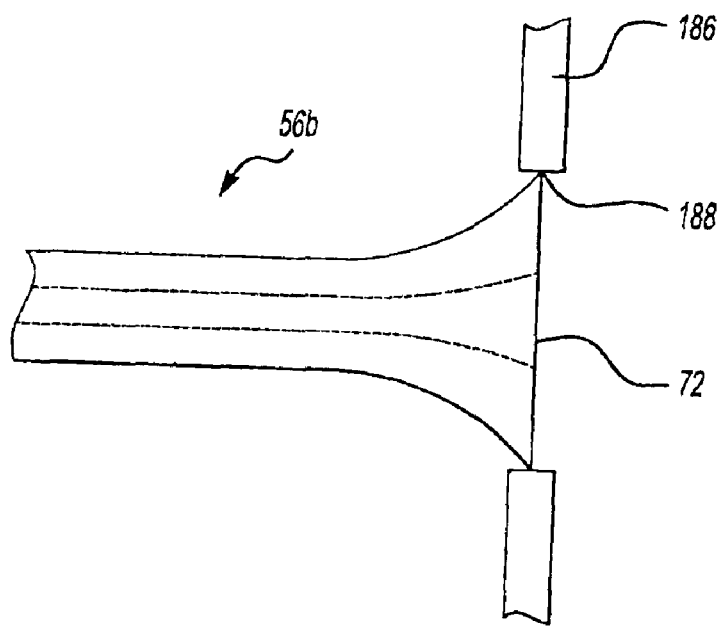
FIG. 9 illustrates a cross-sectional side view of a second type of attachment of a tube to a metal holding plate.

Alternatively, as show in FIG. 9, the holding plate 186 is formed of metal. The ends 72 and 84 of the expanded tubes 56B and 80B are heated and flared to attach each to an aperture 188 of the holding plate 186. Although only tube 56B is illustrated, tube 80B is attached in the same manner.

Figure 11:
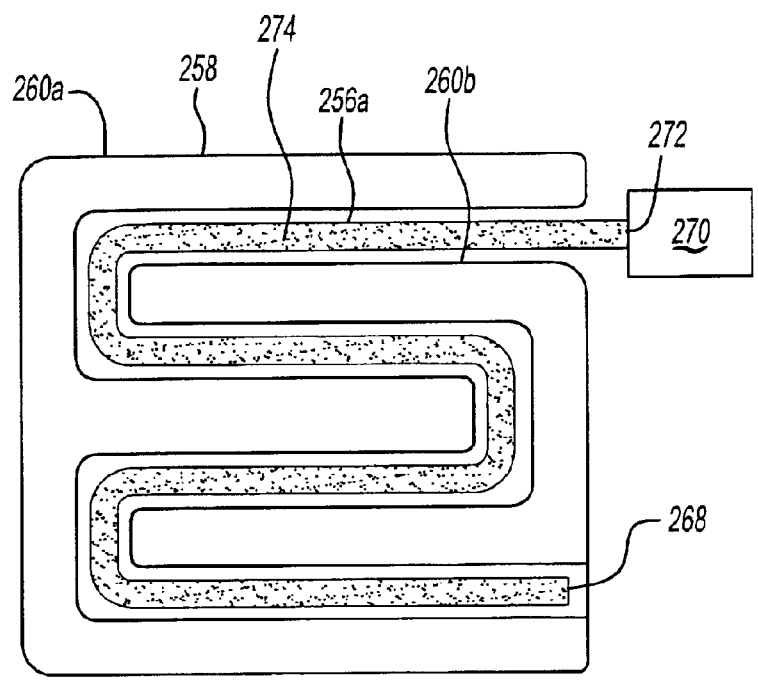
FIG. 11 illustrates an extruded tube positioned in a mold to form a cell of a condensing heat exchanger in a single process.
Figure 12:
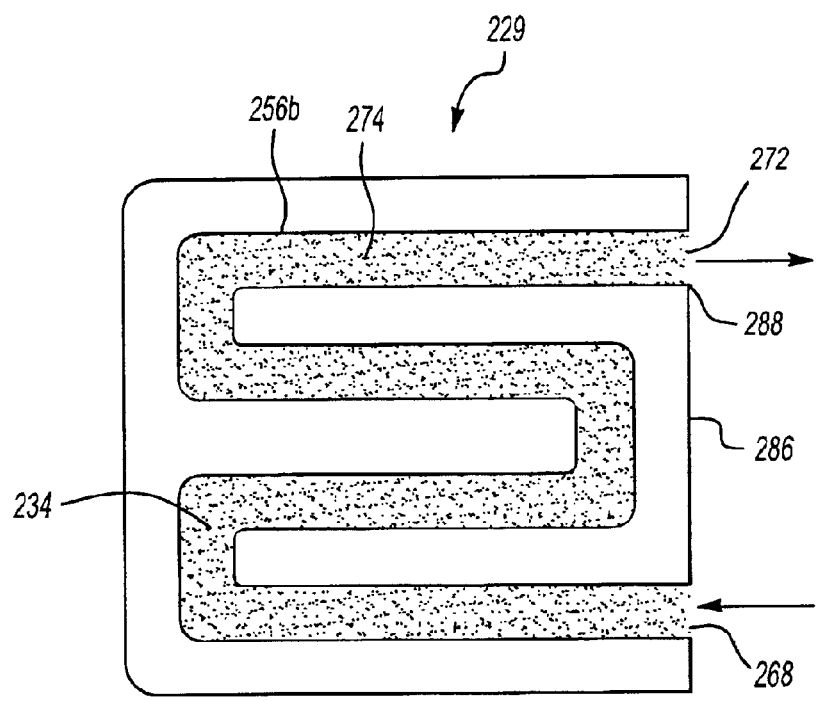
FIG. 12 illustrates the finished cell of FIG. 11.

Alternatively, as shown in FIG. 11, a cell 229 is blow molded in a single process. An extruded tube 256A is positioned in a mold 258 having a substantially "w-shaped" outer part 260A and a substantially "u-shaped" inner part 260B such that a first end 268 of the tube 256A is pinched closed. A blowing machine 270 positioned on the second end 272 of the tube 256A blows air into the internal space 274 of the tube 256A, expanding the tube 256B into a serpentine shape being substantially "w-shaped." The end 268 of the expanded tube 256B is then opened by a finishing operation. The ends 268 and 272 of the expanded tube 256B are adhered to a blow-molded norbornene polymer plate or flange 286 which surrounds and encloses the expanded tube 256B, forming the cell 229. The flue gases flow through the flow passage 234 in the expanded serpentine tube 256B and transfer heat to the surrounding air to be heated.

Figure 10:
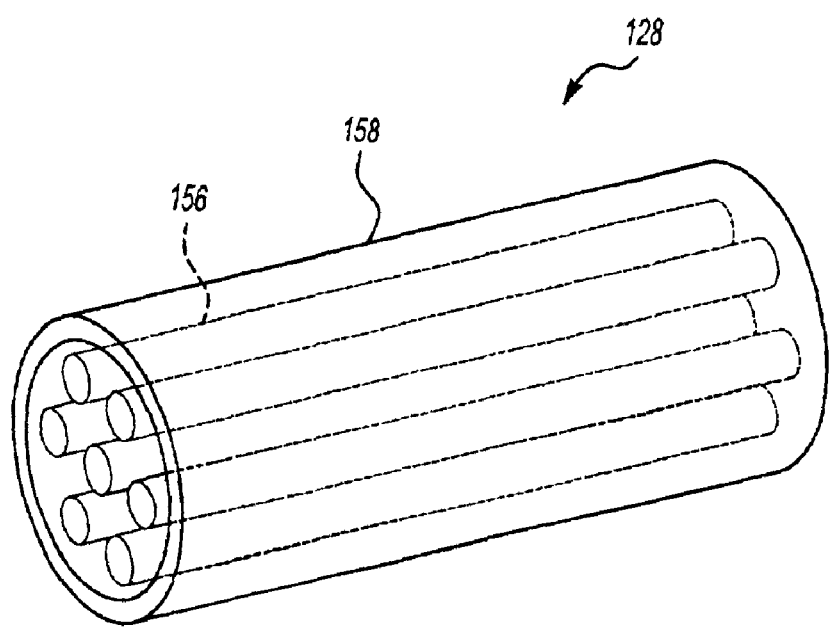
FIG. 10 illustrates a shell and tube heat exchanger employing extruded tubes of norbornene polymers.

Alternatively, an extruded norbornene polymer tube 156 is employed in a shell and tube heat exchanger 128, as illustrated in FIG. 10. Flue gases flow through the plurality of tubes 156 and exchange heat with air flowing in a shell portion 160.

Although this invention has been disclosed as being used with a condensing heat exchanger, the present invention can also be utilized in a hot water heater, or other heat exchanger. Additionally, other molding process can be utilized.

There are several advantages to employing the norbornene polymer condensing heat exchanger 28 of the present invention. For one, norbornene polymer possesses exceptional temperature resistance to the high temperature flue vent gases, and has physical and chemical resistance to the acidic condensate formed by the condensing heat exchanger 28, reducing corrosion. Additionally, the norbornene polymer condensing heat exchanger 28 is inexpensive. Finally, the extruded tubes 56B, 80B and 156 can be formed using current commercial extrusion and blow molding processes.

Accordingly, the present invention provides a condensing heat exchanger made of norbornene polymer.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for making a heat transfer component and using the heat transfer component comprising the steps of:
    melting norbornene polymer;
    hot extruding the norbornene polymer to form extruded tube;
    expanding the extruded tube to form an expanded tube;
    using the expanded tube as part of a cell of the heat transfer component;
    producing combustion products with a burner;
    flowing the combustion products through the cell;
    flowing air around the cell; and
    exchanging heat between the combustion products and the air.

2. The method as recited in claim 1 wherein the expanded tube comprises a first expanded tube and a substantially u-shaped second expanded tube, wherein the step of expanding includes expanding each of the first expanded tube and the substantially u-shaped second expanded tube with air in a mold.

3. The method as recited in claim 2 wherein the first expanded tube and the substantially u-shaped second expanded tube each include a plurality of tube grooves formed by expanding the first extruded tube and the substantially u-shaped second extruded tube in the mold which includes a plurality of mold grooves on an inner surface of the mold.

4. The method as recited in claim 2 wherein the mold includes a bottom portion and a top portion, the method further including the steps of positioning the extruded tube in the bottom portion of the mold and placing the top portion on the bottom portion to retain the extruded tube therebetween.

5. The method as recited in claim 2 wherein the first expanded tube includes an end and the substantially second expanded tube includes a pair of ends and an opening is defined between the pair of ends, wherein the first expanded tube is located in the opening, and the method further comprises the step of attaching the end and the pair of ends to a flange made of norbornene to form the cell by thermally adhering the first end and the pair of ends to the flange, and wherein the first expanded tube and the substantially u-shaped second expanded tube include a plurality of tube grooves formed by expanding the first extruded tube and the substantially u-shaped second extruded tube in the mold, and the mold includes a plurality of mold grooves on an inner surface of the mold.

6. The method as recited in claim 2 wherein the first expanded tube includes an end and the substantially u-shaped second expanded tube includes a pair of ends and an opening is defined between the pair of ends, and the method further comprises the step of attaching the end of the first expanded tube and the pair of ends of the substantially u-shaped second expanded tube to a flange to form the cell, and said first expanded tube is located in the opening, and a flue gas passage is defined between the first expanded tube and the substantially u-shaped second expanded tube.

7. The method as recited in claim 6 wherein the flange is norbornene polymer, and the step of attaching the end and the pair of ends to the flange includes thermally adhering the first end and the pair of ends to the flange.

8. The method as recited in claim 6 wherein the flange is metal, and the step of attaching the first end and the pair of ends to the flange includes heating and flaring the first end and the pair of ends.

9. The method as recited in claim 6 wherein the substantially u-shaped second expanded tube is continuous between the pair of ends.

10. The method as recited in claim 6 wherein the combustion products flow in the flue gas passage.

11. The method as recited in the claim 1 wherein the step of forming the cell includes expanding the extruded tube with air in a mold to form a substantially w-shaped expanded tube and attaching a pair of ends of the substantially w-shaped expanded tube to a flange to form the cell, and a passage is defined in the expanded tube.

12. The method as recited in claim 1 wherein the cell is employed in a shell and tube heat exchanger.

13. The method as recited in claim 1 wherein the cell comprises a first cell and a second cell, and the combustion products flow in the cell and the air flows between the first cell and the second cell.

14. The method as recited in claim 1 wherein said heat transfer component is a condensing heat exchanger.

15. The method as recited in claim 1 wherein the burner burns air and natural gas to produce the combustion products.

16. The method as recited in claim 1 further including the step of pulling the combustion products through the heat transfer component.

17. A method for making a heat transfer component comprising the steps of:
    forming a cell of a norbornene polymer, the cell including a first expanded tube and a second substantially u-shaped expanded tube having a pair of ends, and an opening is defined between the pair of ends, the substantially second u-shaped expanded tube is continuous between the pair of ends, wherein the first tube is located in the opening;
    using the cell as part of the heat transfer component;
    producing combustion products with a burner;
    flowing the combustion products through the cell;
    flowing around the cell; and
    exchanging heat between the combustion products and the air in the cell.

18. The method as recited in claim 17 further comprising the step of attaching an end of the first expanded tube and the pair of ends of the substantially u-shaped second expanded tube to a flange to form the cell.

19. The method as recited in claim 18 wherein the flange is made of norbornene polymer, and the step of attaching the end and the pair of ends to the flange includes thermally adhering the first end and the pair of ends to the flange.

* * * * *